(12) United States Patent
Oliver

(10) Patent No.: US 7,627,703 B2
(45) Date of Patent: Dec. 1, 2009

(54) INPUT DEVICE WITH AUDIO CAPABILITIES

(75) Inventor: Thomas C. Oliver, Windsor, CO (US)

(73) Assignee: Microsoft Corporation, Redmond, WA (US)

( * ) Notice: Subject to any disclaimer, the term of this patent is extended or adjusted under 35 U.S.C. 154(b) by 197 days.

(21) Appl. No.: 11/168,469

(22) Filed: Jun. 29, 2005

(65) Prior Publication Data

US 2007/0005849 A1  Jan. 4, 2007

(51) Int. Cl.
  *G06F 13/38* (2006.01)
(52) U.S. Cl. .......................... 710/72; 710/73
(58) Field of Classification Search .................. 710/72
  See application file for complete search history.

(56) References Cited

U.S. PATENT DOCUMENTS

| | | | | |
|---|---|---|---|---|
| 6,289,140 B1 * | 9/2001 | Oliver | ......................... | 382/313 |
| 6,370,551 B1 * | 4/2002 | Golovchinsky et al. | ..... | 715/234 |
| 7,027,986 B2 * | 4/2006 | Caldwell et al. | ............ | 704/235 |
| 7,158,871 B1 * | 1/2007 | Ilan et al. | ...................... | 701/49 |
| 7,232,271 B2 * | 6/2007 | Adams | ........................ | 401/116 |
| 2002/0079371 A1 * | 6/2002 | Bobrow et al. | ............... | 235/454 |
| 2002/0138249 A1 * | 9/2002 | Kanevsky et al. | .............. | 704/2 |
| 2002/0145596 A1 * | 10/2002 | Vardi | .......................... | 345/179 |
| 2003/0065504 A1 * | 4/2003 | Kraemer et al. | ................ | 704/8 |
| 2005/0101314 A1 * | 5/2005 | Levi | ........................... | 455/423 |
| 2005/0110778 A1 * | 5/2005 | Ben Ayed | .................... | 345/179 |
| 2006/0229862 A1 * | 10/2006 | Ma et al. | ........................ | 704/4 |

* cited by examiner

*Primary Examiner*—Henry W. H. Tsai
*Assistant Examiner*—John B Roche
(74) *Attorney, Agent, or Firm*—Merchant & Gould; Ryan T. Grace

(57) ABSTRACT

An input device is provided for capturing handwriting strokes while in a handwriting mode and for providing audio-related functionality. The input device may be formed in the shape of a pen, and may or may not include an ink cartridge to facilitate movement of the input device in a familiar manner. In one configuration, an input device provides verbal messages, such as warnings to a user. In another configuration, an input device receives audible commands and performs related actions. In a further configuration, an input device recognizes specific movements, such as a word traced therewith, and provides audible information based on the movements. Methods for using input devices and computer-readable instructions for performing the methods are also provided.

20 Claims, 8 Drawing Sheets

INPUT DEVICE WITH AUDIO CAPABILITIES

BACKGROUND

Computer systems using graphical user interface (GUI) systems, such as Microsoft® Windows, are optimized for accepting user input from one or more discrete input devices such as a keyboard (for entering text), and a pointing device (such as a mouse) with one or more buttons for activating user selections. Stylus-based user interfaces are input devices that provide the user with printed paper-type functionality. One approach for the stylus-based user interface is to use resistive technology (common in today's PDAs). Another approach is to use active sensors in a laptop computer.

Conventional stylus-based input devices include battery-operated writing instruments that allow the user to digitally capture a handwritten note or drawing. Such a stylus-based input device typically attaches to a Universal Serial Bus cradle that permits the user to upload handwritten notes or drawings to a computer system. These devices include a capture system that cooperates with special digital paper or a sensor board to digitally capture what the user has written. The capture system is specifically designed to read patterns on the digital paper or sensor board in order to interpret writing and paper position.

Conventional stylus-based input devices are dedicated to sensing movement and physical contact with a surface. They provide a singular type of functionality limited to writing, tapping, or otherwise contacting a surface, such as a computer screen, paper or a sensor board.

SUMMARY

Aspects of the present invention relate to an input device for generating electronic ink and providing audio-related functionality. The input device may be formed in the shape of a pen, and may or may not include an ink cartridge to facilitate movement of the input device in a familiar manner. The input device may generate electronic ink using an image sensor and/or otherwise sensing movement, as well as provide audio functionality.

In one embodiment, an input device provides verbal messages, such as warnings to a user. In another embodiment, an input device receives audible commands and performs related actions. In a further embodiment, an input device recognizes specific movements of the device, such as a word traced therewith, and provides audible information based on the movements.

Aspects of the invention further include methods for using input devices disclosed herein, as well as computer-readable instructions for performing the methods. The foregoing summary of aspects of the invention, as well as the following detailed description of various embodiments, is better understood when read in conjunction with the accompanying drawings, which are included by way of example, and not by way of limitation with regard to the claimed invention.

DETAILED DESCRIPTION OF THE DRAWINGS

Aspects of the present invention relate to an input device that may be used in a variety of different platforms from controlling a desktop or laptop computer, writing on a whiteboard, writing on a surface, such as paper, controlling a PDA or cellular phone, creating ink that may be ported among various platforms or capturing images. The input device includes an image capture system for use with creating ink and digital writing, and an audio system for providing additional functionality.

Terms

Pen—any writing implement that may or may not include the ability to store ink. In some examples a stylus with no ink capability may be used as a pen in accordance with embodiments of the present invention.

Camera—an image capture system.

Active Coding—incorporation of codes within the object or surface over which the input device is positioned for the purpose of determining positioning and/or movement of the input device using appropriate processing algorithms.

Passive Coding—detecting movement/positioning of the input device using image data, other than codes incorporated for that purpose, obtained from the object or surfaces over which the input device is moved using appropriate processing algorithms.

Input Device—a device for entering information which may be configured for generating and processing information.

Active Input Device—an input device that actively measures signals and generates data indicative of positioning and/or movement of the input device using sensors incorporated within the input device.

Passive Input Device—an input device for which movement is detected using sensors incorporated other than within the input device.

Computing Device—a desktop computer, a laptop computer, Tablet PC™, a personal data assistant, a telephone, or any device which is configured to process information including an input device.

Example Computing Environment

Figure 1:
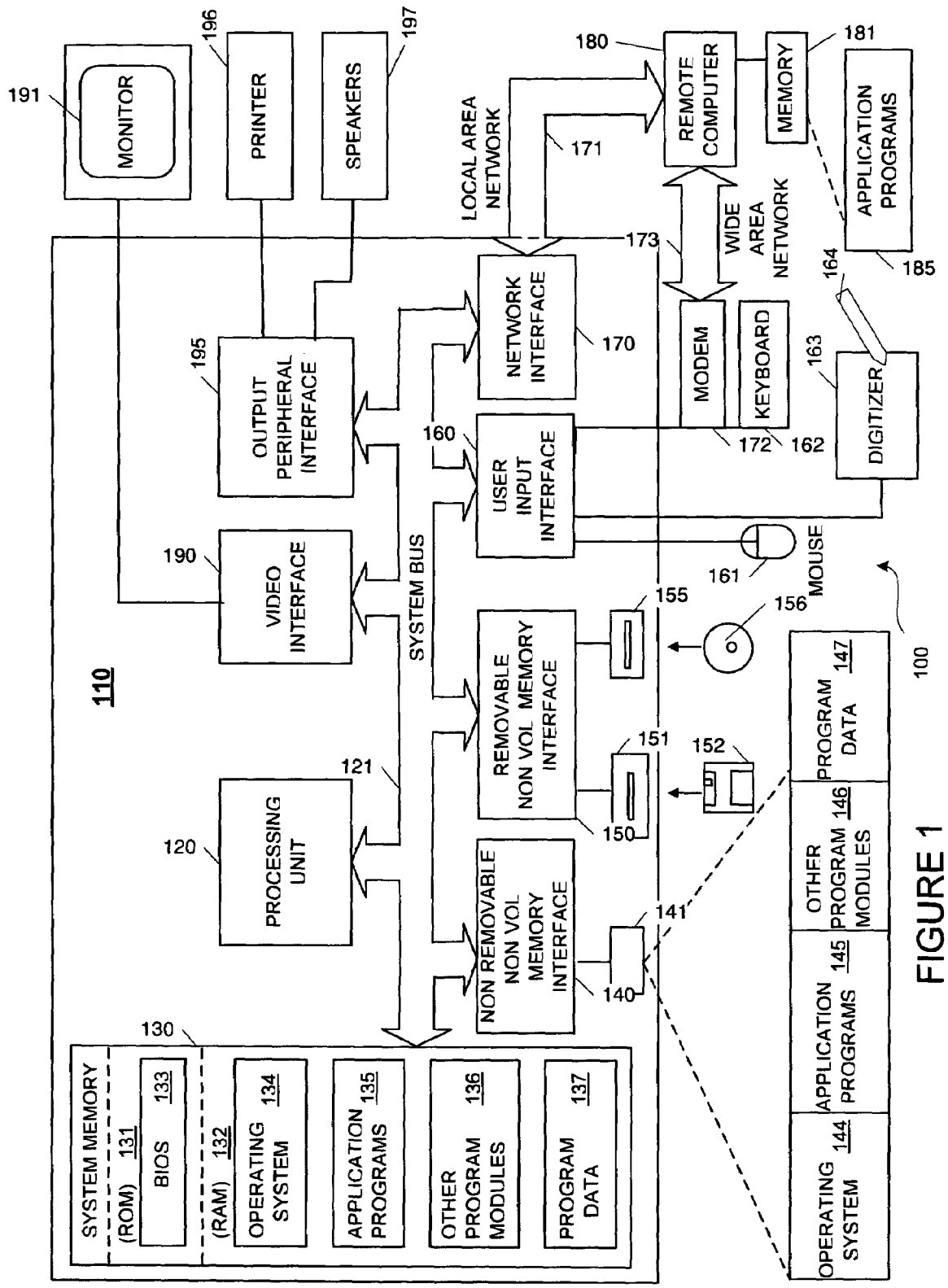
FIG. 1 illustrates a schematic diagram of a general-purpose digital computing environment in which certain aspects of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency or requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera (not shown), a keyboard 162, and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

In one embodiment, a pen digitizer 163 and accompanying pen or stylus 164 are provided in order to digitally capture freehand input. Although a direct connection between the pen digitizer 163 and the user input interface 160 is shown, in practice, the pen digitizer 163 may be coupled to the processing unit 120 directly, via a parallel port or other interface and the system bus 121 as known in the art. Furthermore, although the digitizer 163 is shown apart from the monitor 191, the usable input area of the digitizer 163 may be co-extensive with the display area of the monitor 191. Further still, the digitizer 163 may be integrated in the monitor 191, or may exist as a separate device overlaying or otherwise appended to the monitor 191.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Example Input Device Configurations

Figure 2:
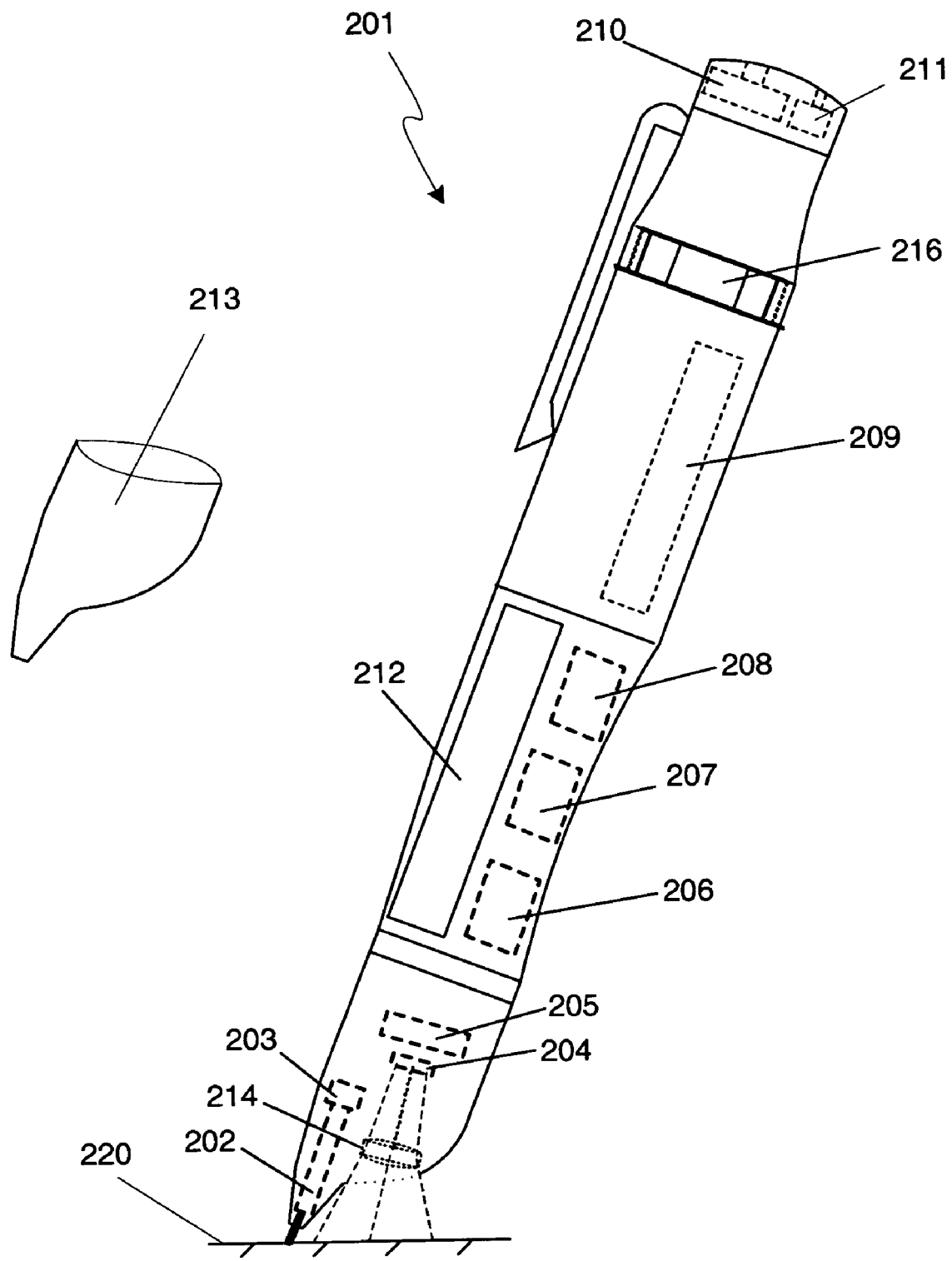
FIG. 2 illustrates an input device in accordance with at least one aspect of the present invention.

FIG. 2 provides an illustrative embodiment of an input device for use in accordance with various aspects of the invention. The following describes a number of different elements and/or sensors of input device embodiments. Various sensor combinations may be used to practice aspects of the present invention. Further, additional sensors may be included as well, including a magnetic sensor, an accelerometer, a gyroscope, a microphone, or any sensor for that might detect the position of the input device relative to a surface or object or provide additional functionality.

In FIG. 2, pen 201 includes an ink cartridge 202, a pressure sensor 203, an image sensor 204, an inductive element 205, a processor 206, memory 207, a transceiver 208, a power supply 209, a docking interface 210, a display 212, a lens 214, a speaker 216 and a microphone 211. The various components may be electrically coupled as necessary using, for example, a bus (not shown). Pen 201 may serve as an input device for a range of devices including a desktop computer, a laptop computer, Tablet PC™, a personal data assistant, a telephone, or any device which may process and/or display information. Further, pen 201 may also provide functionality as a stand alone device.

The input device 201 may include an ink cartridge 202 for performing standard pen and paper writing or drawing. Moreover, the user can generate electronic ink with the input device while operating the device in the manner typical of a pen. Thus, the ink cartridge 202 may provide a comfortable, familiar medium for generating handwritten strokes on paper while movement of the pen is recorded and used to generate electronic ink. Ink cartridge 202 may be moved into a writing position from a withdrawn position using any of a number of known techniques. Alternatively, ink cartridge 202 may be replaced with a cartridge that does not contain ink, such as a plastic cartridge with a rounded tip, but that will allow the user to move the pen about a surface without damaging the pen or the surface. Additionally, an inductive element or elements may be included to aid in detecting relative movement of the input device by, for example, providing signals indicative of the input device in a manner similar to those generated by a stylus. Pressure sensor 203 may be included for designating an input, such as might be indicated when the pen 201 is depressed while positioned over an object, thereby facilitating the selection of an object or indication as might be achieved by selecting the input of a mouse button, for example. Alternatively, the pressure sensor 203 may detect the depressive force with which the user makes strokes with the pen for use in varying the width of the electronic ink generated. Further, sensor 203 may trigger operation of the image sensor. In alternative modes, image sensor 204 may operate independent of the setting of pressure sensor 203.

Moreover, in addition to the pressure sensor which may act as a switch, additional switches may also be included to affect various settings for controlling operation of the input device. For example, one or more switches, may be provided on the outside of the input device and used to power on the input device, to activate the image sensor and/or a light source, to control the sensitivity of the sensor or the brightness of the light source, set the input device in a sketch mode in which conversion to text is not performed, or to set the device to store the input data internally. In other examples, additional switches may be included to process and store the input data, to transmit the data to the processing unit such as a computing device with which the input device is capable of communicating, to switch modes of the device and/or to control any setting that might be desired.

Image sensor 204 may be included to capture images of the surface over which the pen is moved. Inductive element 205 also may be included to enhance performance of the pen when used as a stylus in an inductive system. Processor 206 may be comprised of any known processor for performing functions associated with various aspects of the invention, as will described in more detail to follow. Similarly, memory 207 may include a RAM, a ROM, or any memory device for storing data and/or software for controlling the device or processing data. The input device may further include a transceiver 208. The transceiver permits information exchange with other devices. For example, Bluetooth® or other wireless technologies may be used to facilitate communications. The other devices may include a computing device which may further include input devices.

Power supply 209 may be included, and may provide power if the pen 201 is to be used independent of and remotely from the host device. The power supply 209 may be incorporated into the input device 201 in any number of locations, and may be positioned for immediate replacement, should the power supply be replaceable, or to facilitate its recharging should the power supply be rechargeable. Alternatively, the pen may be coupled to alternate power supplies, such as an adapter for electrically coupling the pen 201 to a car battery, a recharger connected to a wall outlet, to the power supply of a computer, or to any other power supply.

Docking interface 210 may be used to transfer information between the input device and a second device, such as an external host computer. The docking interface 210 may also include structure for recharging the power supply 209 when attached to a docking station (not shown) or when connected to a power supply. A USB or other connection may removably connect the input device to a host computer through the docking station, or through an alternative port. Alternatively, a hardwire connection may also be used to connect the pen to a second device capable of transferring and receiving data. In a hardwired configuration, the docking station link would be omitted in favor of wiring the input device directly to a host. The docking station link may be omitted or replaced with another system for communicating with a second device (Bluetooth® 802.11b, for example).

The shell of input device 201 may be comprised of plastic, metal, a resin, a combination thereof, or any material that may provide protection to the components or the overall structure of the input device. The shell may include a metal compartment for electrically shielding some or all of the sensitive electronic components of the device. The input device may be of an elongated shape, which may correspond to the shape of a pen. The device may, however, be formed in any number of shapes consistent with its use as an input device and/or ink generating device.

Display 209 may include a liquid crystal display or other type of display that permits the user to review documents and images created. The user may select formatting of the document before or after the information, such as text, is input, or may review the document and make changes to the format of the document. Viewing the document created on such a display, in the context of the above example, the user may insert a header including his or her address in the appropriate location. In addition, as discussed further below, display 209 may show images captured by the device in a scene capture mode.

Image sensor 204 may include a complementary metal oxide semiconductor (CMOS) image sensor, a charge-coupled device (CCD) image sensor, or other type of sensor for receiving image information. The camera system including image sensor 204, lens 214 and processing component 206 permits pen 201 to generate electronic ink by detecting movement of the pen with respect to a writing surface. The camera system can capture images of the surface over which the pen is moved, and through image analysis, detect the amount of movement of the pen over the surface being scanned. The movements may be correlated with the document and electronically transpose, add, or associate (e.g. store input annotations apart from the original document) electronic ink to the document.

To aid in the detection and/or positioning of the input device, the surface of an object over which the input device is positioned may include image data that indicates the relative position of areas of the surface. In one exemplary embodiment, the surface being scanned may comprise the display of a host computer or other external computing device, which may correspond to the monitor of a desktop computer, a laptop computer, Tablet PC™, a personal data assistant, a telephone, digital camera, or any device which may display information. Accordingly, a blank document or other image generated on the screen of a Tablet PC™ may include data corresponding to a code that represents the relative position of that portion of the document within the entire document, or relative to any other portion of the image. The information may be comprised of images, which may include alphanumeric characters, a coding pattern, or any discernable pattern of image data that may be used to indicate relative position. The image or images selected for use in designating the location of areas within the surface of the object may depend on the sensitivities of the scanning device incorporated into the camera, such as the pixel resolution of the sensor, and/or the pixel resolution of the image data contained within the surface being scanned. The location information extracted from the object may then be used to track movement of the input device over the object. Using that information, electronic ink or other information corresponding to movement of the input device may be accurately generated. Location information may be used to both detect the position within the image at which the input is to be affected, as well as to provide an indication of movement of the input device over the object surface. The resulting information may be used interactively with word processing software to generate changes in a document, for example.

In an alternate embodiment, the object used in combination with the input device may be composed of paper with positional information included in the background, for example. The positional information may be incorporated in any form of code, optical representation, or other form that may be sensed by a sensor associated with the input device and used to represent the relative location of the specific site on the paper.

Further, the surface over which the input device is moved may include the display of a computing device, a mouse pad, a desktop, or any non-uniform reflective surface from which objects or image data may be extracted indicating movement of the input device over that surface. The tracking algorithm with which the captured image data may be processed may be fixed or may vary dependent on the characteristics of the images captured. Using a simple tracking algorithm, the processor may detect grains in the wood of a desktop, for example, and based on a comparison of a sequence of images captured by the image sensor, the relative location of particular patterns of grain within successive images may be used to determine the location of the input at various times and/or the relative movement of the input device over that surface. A more complex tracking algorithm may be required where features within the images are less easily discerned and the image more uniform. Alternative passive coding techniques may also be employed consist with aspects of the invention.

Example Input Device Hardware

Figure 3:
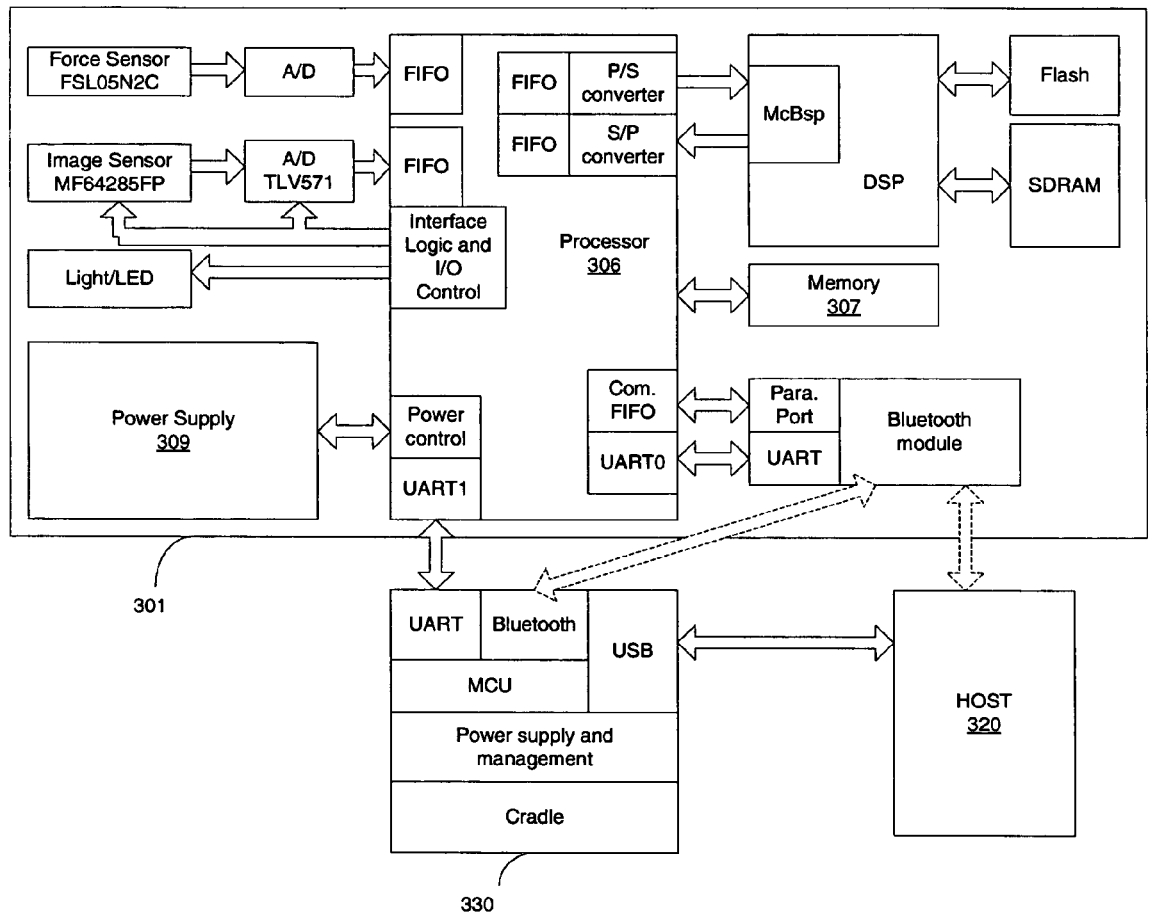
FIGS. 3 and 4 show illustrative hardware architectures of a system in accordance with at least one aspect of the present invention.

FIG. 3 shows a hardware architecture of a system in accordance with one embodiment of the present invention. Many of the same or related components illustrated in previous embodiments will be represented using like reference numerals. Processor 306 may be comprised of any known processor for performing functions associated with various aspects of the invention. For example, the processor may include an FPSLIC AT94S40, and may be comprised of an FPGA (Field Programmable Gate Array) with an AVR core. The AVR device may include a 20 MHz clock and operate at a speed of 20 MIPS. Of course, selection of a processor for use in input device 301 may be dictated by the cost and/or processing speed requirements of the system. The processor 306 may perform image analysis, should such analysis be conducted within the input device. Alternatively, processing may be performed by a second processor, such as a digital signal processor (DSP) incorporated into the device 301. The processor 306 may further operate to perform steps critical to reducing power consumption to conserve power stored in power supply 309, such as powering down various components when the input device is inactive, which may be based on data indicating movement and/or positioning of the device. The processor 306 may further operate to calibrate and regulate the performance of various components, including adjustments to the intensity of light source or to the sensitivity of the sensing array of image sensor, for example. Also, the processor, or a coupled digital signal processor, may choose from among a plurality of stored image processing algorithms, and may be controlled to select the image analysis algorithm most suitable for detecting movement, in accordance for example, characteristics associated with the surface over which the device is moved. Thus, the image processing algorithm may be selected automatically based on performance considerations programmed into the input device. Alternatively, the input device may be controlled, and settings established, based on inputs selected by a user, for example, via actuations of the force sensor or inputs on the input device, or based on handwritten strokes corresponding to commands.

In one embodiment, memory 307 may include one or more RAMs, ROMs, FLASH memories, or any memory device or devices for storing data, storing software for controlling the device, or for storing software for processing data. As noted, data representing location information may be processed within the input device 301 and stored in memory 307 for transfer to a host computer 320. Alternatively, the captured image data may be buffered in memory 307 within the input device 301 for transfer to a host device 320 for processing or otherwise.

Transceiver, or communication unit, may include a transmission unit and receiving unit. As noted, information representing movement of the input device, either processed into a form suitable for generating and/or displaying electronic ink or otherwise, may be transmitted to a host computer 320, such as the previously described desktop computer, laptop computer, Tablet PC™, personal digital assistant, telephone, or other such device for which user inputs and electronic ink might be useful. The transceiver may communicate with an external device using any wireless communication technique, including Bluetooth® technology, for performing short-range wireless communications, infrared communications, or even cellular or other long range wireless technologies. Alternatively, the transceiver may control the transmission of data over a direct link to a host computer, such as over a USB connection, or indirectly through a connection with docking cradle 330. The input device may also be hardwired to a particular host computer using a dedicated connection. The transceiver may also be used to receive information and/or software, which in one embodiment, may be used for improving performance of the input device. For example, program information for updating the control functions of the processor may be uploaded via any of the previously described techniques. Moreover, software may also be transmitted to the input device, including software for analyzing the image data and/or for calibrating the input device may be downloaded from an external device.

Processor 306 may operate in accordance with an interaction model. An interaction model may be implemented in the form of software for maintaining a consistent experience in which electronic ink is generated regardless of the external device for which the unit performs the functions of an input device. The interaction model may process captured data for conversion into a form universally suitable for use on any number of host devices including a desktop computer, a laptop computer, Tablet PC™, a personal data assistant, a telephone, a whiteboard, or any device that might store, display or record data input via the input device. The processor 306 may recognize the device to which it is connected, or for which the data representing handwritten inputs are intended, and based on such recognition, select processing that converts input data into a form suitable for the specific host device recognized. In that case, a conversion to a form useful for each potential recipient computing device would be contained within the input device and made available as necessary. Recognition of the intended recipient device may be attained as a result of communication between the devices, should they be connected wirelessly or directly. Alternatively, the user may enter the identity of the device or devices for which the data is intended directly into the input device. Of course, if the input device includes a display, data may be processed using a default processing algorithm suitable for use with the display and/or a multitude of other devices.

Figure 4:
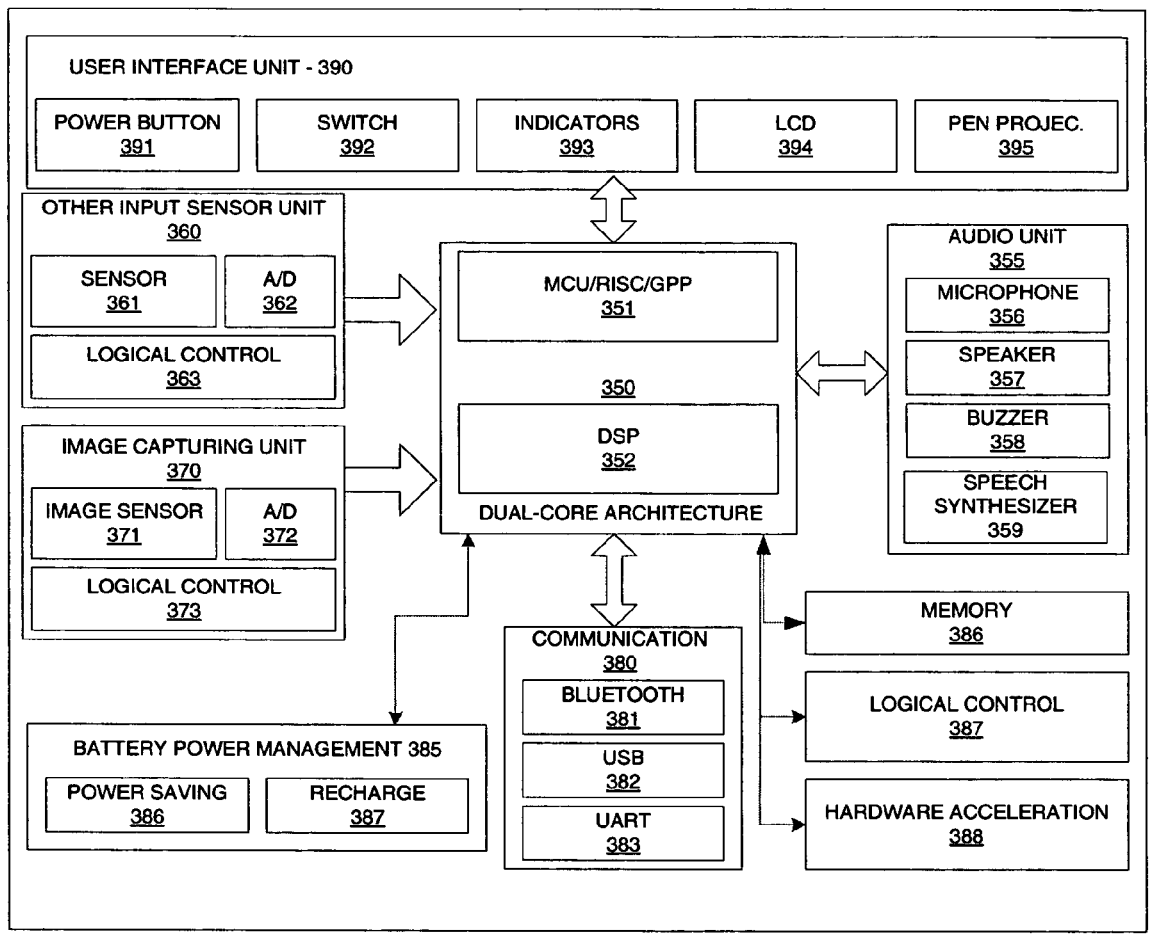

FIG. 4 shows another hardware architecture of a system in accordance with at least one aspect of the present invention. The hardware architecture may be a suite of printed circuit board assemblies (PCAs) and firmware running on the PCAs. The components of the suite of PCAs may include a dual core architecture component 350, an image capturing unit 370, another input sensor unit 360, a communication component 380, an audio unit 355, a user interface unit 390, memory 386, logical control 387, and a hardware acceleration component 388. It should be understood by one skilled in the art that the following boards and their description are not all necessary for the present invention and one or more components may be included for operation of the present invention.

The dual core architecture component 350 includes a RISC (Reduced Instruction Set Computer) or GPP (General Purpose Processor) 351 used for running an embedded OS (Operating System), such as Windows CE®. DSP (Digital Signal Processor) 352 is in charge of running algorithms, such as image processing, maze pattern analysis and m-array decoding. The two cores may be two different chips or built into one chip. MCU/RISC/GPP component 351 may have several sensors and A/D (analog to digital conversion) chips operating simultaneously. The sensors and A/D chips need to be configured and controlled at the same time. MCU/RISC/GPP component 351 can handle system control, computation, and communication because MCU/RISC/GPP component 351 is suitable for real-time parallel computing. One example of MCU/RISC/GPP component 351 may include three chips: XCV50CS144, an FPGA chip from Xilinx of San Jose, Calif. with 50K logic gates and 96 user IOs; XC18V01, a configuration PROM from Xilinx of San Jose, Calif.; and CY62256V, a 32KX8 SRAM (static RAM) from CYPRESS of San Jose, Calif., as buffer for computation.

DSP (Digital Signal Processor) component 352 may consist of two chips. The TMS320VC5510 is a high-performance, low power-consumption, fixed-point DSP chip from Texas Instruments (TI) of Dallas, Tex. Such a chip is very suitable for mobile computing devices. This chip is used for computation to recover strokes as written by the user. The second ship of the DSP component 352 may be the SST39LF160, a 16M bit multi-purpose flash memory from SST of Sunnyvale, Calif. This non-volatile, reliable, compact storage chip is used to store DSP firmware and computation result.

Two input units include the other input sensor unit 360, such as a force input sensor, and the image capturing unit 370. These units generate force and image signals that are outputted to the dual architecture component 350 respectively. Other input sensor unit 360 may include a FSL05N2C, a force sensor chip 361 from Honeywell of Morristown, N.J., a MAX4194, instrumentation amplifier 363 from MAXIM of Sunnyvale, Calif., and a MAX1240, a 12-bit serial A/D converter 362 from MAXIM of Sunnyvale, Calif. Other input sensor unit 360 is configured to sense subtle force changes, in 12-bit precision, at up to about 100K samples per second. Precise force data is needed to indicate whether the input device is being used for writing or how hard the user is pushing the input device while writing. Image capturing unit 370 may include a MF64285FP, a 32×32-pixel image sensor chip 371 from Mitsubishi of Tokyo, Japan, a TLV571, an 8-bit A/D converter 372 from TI of Dallas, Tex., and a logical control component 373. Image capturing unit 370 can capture images at up to 336 fps (frame per second). A minimum 32*32-pixel resolution image sensor is chosen, because a lower resolution cannot capture enough features for processing. Image sensor 371 is a high speed, small sized, low power-consumption image sensor. Image capturing unit 370 may include additional sensors for capturing image data from multiple areas. For example, an input device employing two image sensors 371 may be used for operation with a whiteboard. One image sensor 371 can be configured to capture data representative of the writing of a user. A second image sensor 371 may be configured to scan an indicator, such as a bar code, of a whiteboard pen. In such an example, the bar code of the whiteboard pen may include information pertaining to the color and/or thickness of the whiteboard pen. The second image sensor 371 can capture this data to identify that a user is using a blue whiteboard pen and has a thickness of 1.5 cm.

Communications component 380 may include a WML-C09 chip 381 and an antenna. WML-C09 chip 381 is a Class 2 Bluetooth® module from MITSUMI of Tokyo, Japan. The Bluetooth® chip enables an input device to communicate with a host PC at a speed of 720K bps (bits per second) or 100 frames per second within a range of 10 meters. Bluetooth® is a low cost, low power cable replacement solution with industry wide support, which is suitable for use with the present invention. Each Bluetooth® module is assigned a specific and/or unique Bluetooth® address which can be used to identify the input device itself. Communication component 380 may include a USB port 382 and a UART component 383.

Battery power management component 385 is designed to generate all necessary voltages, for example, 5V, 3.3V, 2.5V, 1.6V, from a supplying Li-ion battery. A 5V supply may be used by image sensor 371 and force sensor 361. A 2.5V supply may be used by the MCU/RISC/GPP component 351 for internal power. A 1.6V supply may be used by the DSP component 352 for internal power. A 3.3V supply may be used by other components, such as for the communication component 380. Power saving component 386 conserves the operational life of the battery power and recharge component 387 recharges the battery power of the input device. Over-discharge protection is also designed to prevent the battery from being damaged. Battery power management component may include the following chips: UCC3952PW-1 from TI of Dallas, Tex. and MAX9402SO8 from MAXIM of Sunnyvale, Calif., together to realize over-discharge protection; TPS60130PWP from TI of Dallas Tex., to generate a 5V supply output; TPS62006DGSR from TI of Dallas, Tex., to generate a 2.5V supply output; TPS62000DGSR from TI of Dallas, Tex., to generate a 1.6V supply output; and TPS62007DGSR from TI of Dallas, Tex. and/or TPS79333 from TI of Dallas, Tex., to generate a 3.3V supply output.

Audio unit 355 provides for audio interface components of the input device. Audio unit 355 may include a microphone 356, a speaker 357, a buzzer 358 and a speech synthesizer 359. These may be logical entities and/or physical entities. For instance, a physical speaker may act as a logical speaker and as a buzzer when provided with buzzer sound information. In addition, a single physical unit may act as both a speaker and a microphone. Audio unit 355, processor 306 (FIG. 3), dual core architecture 350 and/or other components of the input device may further include audio-related software, such as media player/recording software, speech recognition software, language translation software, etc. In addition, audio unit 355 may include other hardware, such as analog-to-digital converters for digitizing audio inputs or digital-to-analog converters for providing output to speakers. Microphone 356 may permit voice recording and/or voice recognition capabilities while using the input device. Speaker 357 can output audio from a variety of sources, including a built-in and/or external MP3 player, a multi-media file, an audio file, and or/some other audio source. Buzzer 358 may be an audible indicator for a user, such as an illegal operation indicator and/or low battery power indicator.

User interface unit 390 provides various user interface elements for communication to and from a user. Power button 391 permits a user to turn the input device on or off and can also be configured to enter into a sleep, standby, or low power mode for conservation of battery power. Functional button/switch 392 can be used as a command input to the input device. Functional button/switch may be an actuatable button for choosing an element in an application program with which the input device operates. Indicators 393 may be LEDs (light emitting diodes) and/or other optical outputs for visual communication with a user. Indicators 393 may change colors, intensity, and/or pulse rate. For example, indicator 393 may change colors when input device changes to a low power mode. LCD (liquid crystal display) 394 may be a mini display that outputs visual information to user. For example, LCD 394 may indicate that the battery is low on the user interface by showing "LO BAT" on the display. Pen projection 395 permits the projection of an image onto a surface. Pen projection 395 provides additional visual information to a user of the input device.

Memory 386 allows for storage of any type of information, including force sensor 361 and image sensor 371 data and operational instructions for a particular application program with which the user interface may operate. Logical control 387 may be used to control peripheral devices. Logical control 387 may be an FPGA or a CPLD (complex programmable logic device). Hardware acceleration unit 388 may be configured to accelerate algorithms in order to increase efficiency of computations of the input device.

Input device 301 also may include one or more inertial sensors for sensing pen movement, position, or orientation, in addition to the previously described components represented with like reference numerals. For example, input device 301 may include a gyroscope for providing data representing the angular velocity of the pen in a plurality of directions. The input device 301 may include one or more accelerometers, or sets of accelerometers, measuring the acceleration or gravitational forces upon the pen. Data representing movement of the pen may also be obtained using a magnetic sensor which measures movements of the pen by detecting variations in measurements of the earth's magnetic field, described herein as an inertial sensor because it detects movement of the input device based on data other than image data. Data from either or any of the inertial sensors incorporated with or into the input device, which may include gyroscopes, accelerometers, magnetic sensor, inductive elements or any device or devices for measuring movement of the input device, may be used in combination with data from the image sensor to obtain data representing movement or positioning of the input device, and thereby produce data for generating electronic ink.

Operational Examples of Input Device Configurations

As noted, a surface of an object over which the input device is positioned and/or moved may include coded image data that indicates the location or relative position of each area within that surface. The object may comprise the display of a computing device, such as a laptop computer. In one embodiment, a document may be recalled from memory and displayed on the screen. Imbedded within that document, such as in the background, may lie coded information indicating the position of each area of the document. For example, the background of the document may include a maze pattern, a sufficiently large enough portion of that pattern uniquely identifying each region within the entire document. The input device may be used in combination with the coded location information to add annotations or edits to the document at specified locations even if the display of the laptop does not include sensors for detecting movement of an input device over a screen. Thus, the input device may function as an "active input device" such that sensors associated with the input device generate data indicative of position or location of that device.

In one example, the image sensor incorporated within the input device captures image data representing the surface of the display screen over which the input device is positioned and/or moved. The sensor captures images including location codes indicating the relative position of the input device. As the user moves about the displayed image, entering annotations and/or making edits to the electronic document displayed, the input device generates signals representing those inputs and data representing the location within the document at which those inputs are to be incorporated. Control of the laptop may be also affected using the input device, in place of a mouse, or to perform other standard inputs function including the movement of a cursor and the actuation of selections.

The input device may be used in conjunction with word processing software to edit the document by, for example, deleting text and inserting new text. To edit the document displayed on the screen of a computing device, a user positions the input device over the screen at the desired location. To delete text, the user may position the input device proximate the screen and move the device in a motion to strike through the image of the text displayed. By sensing the location codes, the image may be processed to determine both that the pen has been moved in a striking motion, and to identify the text corresponding to the location at which the user moved the input device. Accordingly, the inputs may be used to delete that data.

Next, the user may wish to insert new text. In a familiar manner, the user may draw a symbol for inserting text, such as a "carrot" or upside-down "V", at the location at which the new text is to be inserted. Processing software for converting inputs into image data and/or commands, stored in the input device or host computer, recognizes the symbol as a control signal for inserting text. With the aid of the input device, the user may then write text to be inserted by hand.

In an alternative embodiment, the user may add notes with highlighting indicating the original text to which the annotations pertain. For example, the user may select the text to be highlighted using a pull-down menu, or a highlighting button, displayed on the screen. Next, the input device is dragged over text to be selected for highlighting. Then comments to be associated with the highlighted/selected text may be written on the screen of the display at a location adjacent the highlighted text. When the operation is complete, the user may select the prompts necessary for completing entry of annotations. All of these modifications to the document may be created using the input device regardless of whether the display includes sensors for detecting movement of the input device.

Modifications to the document may be displayed and/or incorporated within the document in the form of image data, electronic ink or data converted into text. Conversion of the inputs into text may occur in a manner invisible to the user, such that text appears in the display of the document on screen as it is entered. Alternatively, the handwriting of the user may appear within the body of the document. To achieve instantaneous display of edits, information representing the movement of the pen and the location of such edits may be transmitted to the laptop device on an ongoing basis.

In operation, the input device captures 32×32 pixel resolution images of the surface over which input device is moved and 12-bit precision force data indicating if the input device is used writing or how hard the user is pushing the input device while writing. The image and force data are packaged together into a frame. Then the continuous frame stream is transmitted wirelessly using Bluetooth® at up to 100 frames per second. The input device starts an auto-initialization procedure when powered up and then turns into working mode or standby mode. The input device switches modes in run-time according to the magnification of the pressure value, that is, switches to working mode if the pressure value is larger than a given threshold, else standby mode.

While operating in a working mode, the input device consumes about 120 mA current. Frame data is generated in the other input sensor unit, such as 360 and image capturing unit, such as 370, and outputted to the dual core architecture, such as 350. The dual core architecture receives the image and force data, frames them (image compression, CRC coding, time stamping, framing), and transmits the data to the communication unit, such as 380, for communication with a host PC. Communication unit also provides a high speed UART, such as 383, connecting to a RS-232 at the host PC directly for debugging purpose. The operations in the dual core architecture 350 include data framing, image compression, time stamping, CRC coding, and transmission links control (via UART or Bluetooth).

As noted, the identity of the person entering the inputs may also be recorded. For example, the input device may generate information identifying the user and/or the particular input device. The identity information may be attached to the generated input data. Alternatively, such identification information may be provided as a separate signal transmitted to the host device.

While the above illustrative embodiment identifies the surface over which the input device is moved as the display of a laptop device, the input device may also function to detect positioning using codes incorporated within a surface of any object over which the device may be moved. Thus, an image incorporating location codes may be created and/or editing using the input device in combination with the monitor of a desktop computer, Tablet PC™, a personal data assistant, a telephone, or any device which may display information. Coded information may also be incorporated within a transparent sheet laid over the display screen of such devices, or incorporated within a surface that may be used in combination with a display, including protective films.

Coded information may also be incorporated on a writing surface or on writing material, such as paper, to uniquely identify the locations on that surface. For example, positional information may be incorporated in the background of the paper. As noted, the positional information may include any form of indication or code representing the relative location of the specific site on the paper. Accordingly, the input device may be used in association with coded paper to record information corresponding to the handwriting of a user at the appropriate location. For example, armed with only the input device and a writing surface incorporating coded position information, while riding in a taxi, the input device may be used to draft a letter to a client. Writing on paper with the input device, gestures corresponding to text or other input information are recognized by detecting changes in the location of the input device at certain times. The inputs may then be converted into electronic ink or other electronic data for use in generating information corresponding to those gestures. Conversion of the inputs may be performed as those inputs are generated, either within the input device or if received by a host computing device coupled to the input device. Alternatively, such conversion may be performed at a later time. For example, the information generated using the input device may be stored in memory and transmitted to a recipient and/or host computer for suitable processing at later time.

Data generated using the input device, whether those inputs are handwritten letters, symbols, words or other written images, may be incorporated into a document at locations identified by the location codes. Thus, even in the absence of a formatted template, the layout of a document, such as the previously described letter, may be achieved using the location information identifying the location within the document at which the information is to be entered. For example, the address of the drafter, address of the recipient, body and closing of the letter, and remaining components, may be entered on the paper at the appropriate location. Using the coded location information captured by the image sensor, the words or other images forming the contents of the corresponding electronic document are incorporated at the appropriate locations.

Using detected location information, the input device may also interact with the host computing device for entering commands and making selections and the like. Where the computing device is a portable camera or telephone with web browsing properties, the input device may be used in the manner of a stylus or a mouse to select from displayed buttons or menus. Therefore, the input device may be used to activate the browser of the host computer and to select options for retrieving a file, such as the previously described document, even one stored remotely. Using the input device, the user may select downloading of the file containing the information needed by the user. Next, the user may enter annotations to the downloaded file or files via the input device. Those edits may be transmitted to the remote location from which the file was downloaded, where the input device is equipped to perform communications with remote computing devices. Alternatively, the edits may be used to edit the file stored within the input device and/or a host computing device, assuming the input device is in communication with the host computing device.

In another embodiment, the file displayed on the monitor of a host computing device may be a spreadsheet, generated using spreadsheet software such as EXCEL™ from Microsoft® Corporation of Redmond, Wash. The location codes can be used to associate locations with given cells within the spreadsheet. The user may enter a numerical entry in the cell displayed on the screen. At that time, the input device captures images associated with the location of the input device and transmits that information to the host computing device. The processing software located in the host computing device, for example, and working in combination with the spreadsheet software, determines the identity of the cell selected for entry based on the detected location codes, and modifies the spreadsheet document contents accordingly.

The input device may also be used to recall images or other prestored information associated with particular gestures or combination of gestures. For example, the input device may be used to draw a symbol which the processing algorithms device is programmed to recognize. The maze pattern may be used to accurately detect movement of the input device over the pattern so that a particular symbol associated with such movement may be detected. For example, the user may control the input device to draw a symbol on the paper previously identified by the user to be associated with the company logo. The maze pattern may identify a combination of movements corresponding to the letter "M" followed immediately by the letter "S" as an instruction to designate entry of a logo of the Microsoft® Corporation. As a result, such prestored information, may be entered within a document by entry of a sequence of previously inputs.

The input device may also be used as a passive input device. In that mode, the input device may be used in combination with a computing device that senses movement of the input device using resistive sensing, for example. When used in combination with a device that includes a sensor board for detecting movement of an input device, such as a Tablet PC™ or personal data assistant, the input device may function in the manner of a stylus. Using the input device, electronic ink or other image data may be generated with the input device is positioned in very close proximity to the screen. Control functions may be entered in a similar manner. Additionally, the image displayed on the monitor of the particular computing device may also include data corresponding to a code that represents the relative position of that portion of the document. The location information extracted from the object using the camera may then be used to track movement of the input device, as a substitute to, or in combination with, movement detected using sensors of the computing device.

For example, a user may wish to create or modify an image on a portable computing device which already includes the ability to detect positioning of an input device, such as the Tablet PC™ or personal data assistant. The input device may function solely as a passive input device, such that information representing movement of the input device is generated by the computing device. The sensors of the computing device, however, may not have the ability to detected movement of the pen at a range required by the user in a given situation. For example, accurate detection of user inputs may be hindered when the user is traveling in an unstable vehicle. As the user edits a file by moving the input device over the surface of the display of the computing device, the input device may be jostled and displaced a significant distance from the sensor board. Image data captured by the input device may be used to detect movement of the input device within a plane horizontal to the surface of the computing device, even though the signals generated by the sensors of the computing device have become less accurate. Even if the sensors of the computer device are no longer capable of detecting movement of the input device, the image sensor may produce sufficient information to maintain an accurate representation of the movement of the input device to reflect the intended inputs of the user. Thus, even when used in combination with a computing device including the capability of sensing movement of the input device, the input device may function as a passive input device or as an active input device.

The input device may also be used in association with any paper, writing surface or other substrate, to record information corresponding to the handwriting of a user. Again, armed with only the input device and a writing surface, the input device may be used to draft a letter to a client. In this case, gesturing is detected on the basis of passive coding, wherein movements of the input devices are detected using other than codes embedded within and/or printed on the image of a surface of the substrate. For example, the user may draft the letter on a plain sheet of paper. As the user writes with the input device, the image sensor captures images of the paper.

Objects within the images may be identified and their movement within the series of captured images may be indicative of movement. Sensed objects may include artifacts or other objects on the surface of the paper, which may correspond to a watermark or other defect of the paper. Alternatively, the paper may include ruled lines which may also be used to calculate movement of the pen over the surface. Even in the absence of paper, relative movement of the input device may be determined. The input device could be moved over the surface of a desk, the grain of the wood providing the objects necessary for detecting relative movement of the input device. In a manner similar to that previously described, a user can draft a letter on paper, or any surface over which movement can be detected optically. The movements of the input device may be stored in memory and/or converted into information representing those gestures.

In yet another embodiment, the portable device may be used as a substitute for a portable computing device. For example, having just crafted a solution to the circuit failures associated with her company's pacemaker, but with no laptop or other computing device available, an engineer may turn to her input device as a suitable replacement for recording her thoughts as she travels by train to meet the rest of the design team. Making the most of the time available (and with the ink cartridge removed or the cap in place), on the back of the chair in front of her, the user composes a sketch representing a modification to the suspect electrical circuit in question. She activates the input device, sets it in a mode conducive to generating a sketch (which may, for example, include deactivation of conversions), and begin sketching a simplified design representing a solution to the problem. The input device may then store the file representing the handwritten strokes. Switching out of a sketch mode, notations and references may be jotted down next to relevant portions of the sketch, and those entries incorporated within the image file. For example, the user may switch to a notation mode, in which gestures corresponding to letters are recognized. Thus, she may incorporate a description of her proposed solution along with the sketch. Rather than wait until reaching the medical research center, the operator may choose to transmit the schematic to the rest of the design team for full consideration prior to the scheduled meeting. Such transmission may be achieved any number of ways, including uploading the revised document from the input device to a portable wireless device such as a cellular telephone. The information may then be used to generate an image file such as a VISIO™ document.

Once transmitted to the remaining members of the team, the previously described file corresponding to a sketch of a schematic may be displayed on the monitor of a team member's host computing device. For example, the image and accompanying text may be presented on the display of a desktop computer. By placing the input device in proximity to the image of the file displayed on the monitor, additional annotations may be added to those displayed. In that case, movement of the input device may be detected by measuring the relative movement of objects within images captured by the optical sensor of the input device. Signals generated by the input device may be processed by software stored within the input device, or transmitted to the host computing device for processing. Processing of the detected movement may generate electronic ink, text, or other data representing the notations entered via the input device.

The input device may be used in conjunction with a computing device having sensors for detecting movement of the input device, even in the absence of location codes. For example, the input device may be used as a source for generating handwritten notes on a personal data assistant or other computing device designed for use with a stylus. Therefore, while running errands a user may be reminded of and wish to add an item to an existing "to do list." The user retrieves the list stored in a host computing device, such as a personal data assistant. Positioning the tip of the input device over the display of the personal data assistant, the user is able to traverse through menus and make selections to retrieve the desired list. Presented with this list, the user may input checks on the screen of the host device in empty boxes located next to descriptions of tasks already completed. The input device captures images of the screen including data corresponding to the box and transmits that data to the host computing device. Using a processing algorithm for analyzing image data, the host computing device then detects the shape of the box as an object for which an entry may be made. To successfully enter check marks, the image data may be processed to detect movement of the pen over and within the area of the box, the gestures forming the recognized shape of a "check." The host device then modifies the file associated with the list to include a representation of a check within the box. Positioning the input device over the space following the last item in the list, the user enters text describing an additional item. The sensors of the host device detect movement of the input device and generate data representing those inputs. The inputs are converted into text and displayed to the user, along with an empty box.

Similarly, a user of Microsoft® Reader, for example, such as a student reading an assigned novel, may wish to jot down notes next to the relevant text. The image displayed on the monitor of the portable host device is annotated using the input device. For example, the user positions the input device over the monitor of the host computer, a Tablet PC™ for example, and enters handwritten notes next to the relevant text. The gestures are detected by the sensors of the host device and stored as electronic data which is converted into image data and displayed on the screen. The notes may remain in handwritten form or may be converted into alphanumeric characters. The notes may not be seen without actuation of additional functions, such as activating viewing of appended comments or positioning the input device over highlighting or some other indication that annotations are present. The notes may then be stored in a separate file, or stored with a copy of the electronic version of the novel stored within the host computer.

In yet another embodiment, information from additional sensors forming part of the input device may be used to supplement or completely replace other forms of movement detection. Such additional sensors may detect linear acceleration of the input device, angular acceleration, velocity, rotation, depressive force, tilt, changes in electromagnetic fields or any sensed indication of movement or positioning of the input device. Such information may aid in an effort to produce more accurate movement detection. Alternatively, the additional sensors may provide the only information available at a given time. For example, the input device may be used in conjunction with a generally uniform surface, such as blank paper. In such cases, the image captured by the optical sensor may provide insufficient information to consistently and accurately detect movement of the input device. If optical motion detection becomes more difficult, such as if objects for tracking movement of the input device become more difficult to detect, in accordance with one embodiment for optically detecting movement, additional information from the additional sensors may be used to provide more refined motion detection. Specifically, the algorithm or algorithms used to determine position and/or movement may incorporate calculations to factor in the additional information and to thereby supplement movement and/or location detection if the optical motion detection.

If optical detection fails to provide useful results, then the additional sensors may provide the only information with which to detect movement. For example, if the user attempts to sketch out a drawing on the uniform white counter of a laminated countertop, the optical sensing system may provide a sufficient data representative of movement. In that case, the additional sensors may provide sufficient information to generate an acceptably accurate representation of input information.

For example, if the input device moves a sufficient distance from the surface being scanned, the optical sensor unit may not capture an accurate representation of the image provided. In that case, additional information from the additional sensors may be used to compliment data obtained by the image of the object over which the input device is moved. Thus, even if the input device moves an inch or greater from the display over which it is being moved (the "z-axis), sensors within the input device may provide an indication of movement of the pen within the plane of the display, i.e., in the horizontal and vertical directions.

For example, an input device used in conjunction with a laptop computer is positioned on the tray table in front of the user. An image of a document, with a maze pattern incorporated into the background, is displayed on the screen of the laptop. Annotations entered by the user are shown in solid blue ink. The seat belt sign comes on as the airplane experiences turbulence. As the user reaches over the keyboard of the laptop computer and adds another word to the annotation, his hand quickly drifts away from the surface of the screen. Although the image sensor may not accurately detect the lines forming the maze pattern displayed, movement in the x and y axis is measured by the additional sensors incorporated within the input device.

Figure 5:
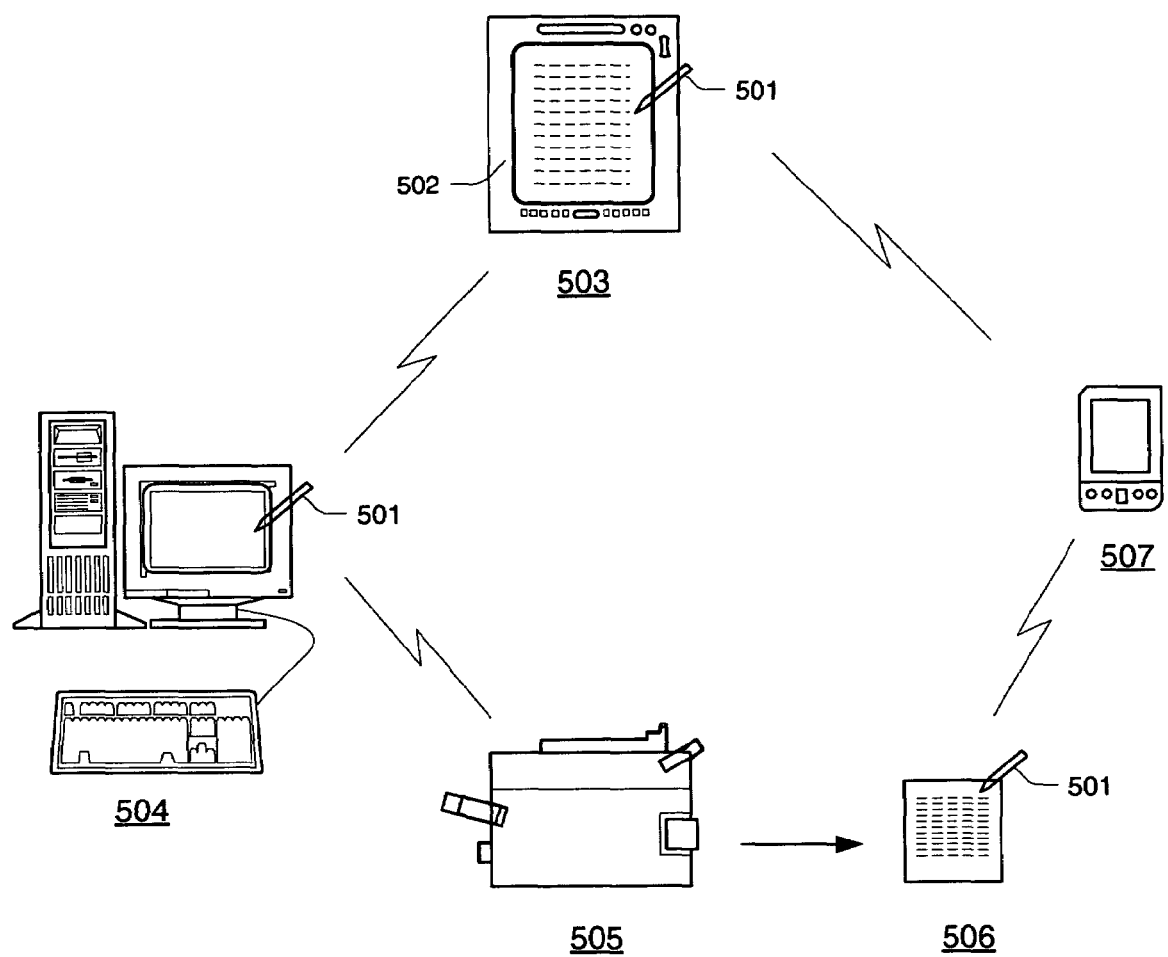
FIG. 5 illustrates several uses of an input device in accordance with embodiments of the present invention.

FIG. 5 illustrates uses of an input device in accordance with several illustrative embodiments of the present invention, as a document is created, transmitted and edited using an input device in various environments. The following description is merely an illustration of uses of the input device and is not intended to limit the structure or functionality of the present invention.

The input device 501 may be used to extend the life of a document by allowing the creation and/or editing of documents in a wide range of environments and for use in association with numerous devices. Using the input device 501, a document 502 may be electronically created on the screen of one computing device, such as Tablet PC 503 illustrated. For example, the input device 501 may be used to generate a handwritten draft of a document. Electronic ink corresponding to the information entered on the screen of the Tablet PC 503 is generated as the input device 501 functions as a stylus for the Tablet PC 503. The electronic ink may be converted into text form and stored in the Tablet PC 503.

The electronic file representing the document may be transmitted to a second computing device, such as desktop PC 504. In that environment, the document may be edited on the screen of the desktop device using the input device 501 operating as an independent input unit. Because the input device 501 senses relative location of the input device 501 within the displayed image of the document, edits entered on the screen of the desktop device may be reflected in the electronic document, even if the display does not include elements for sensing positioning of the input device 501. The edits generated using the input device 501 may be transmitted to the desktop PC 504 as they are generated or may stored within the input device 501 for transmission to any PC at a later time. The edits may be entered into the version of the document stored in the desktop PC 504.

The created document may also be output in hard-copy form by a printer, such as printer 505 linked to the desktop PC 504. The hard-copy 506 version of the document may include information or codes designating the relative location of the input device 501 at any location in the document, using a maze-pattern, for example. The hard-copy may be marked-up by one or more users each having an input device 501, and the edits of each user generated by the separate input device 501. Along with information representing edits, information identifying the pen used to generate those edits may be provided as well. For example, the inputs may be reflected using underlined colored text such as that found in applications for tracking changes made to documents. The edits/inputs may be forwarded from the desktop PC 504 to the Tablet PC 503, for incorporation into that document. Alternatively, the edits may be stored within the input device 501 and uploaded at a later time.

The document may also be output on plain paper, or on any substrate not including indications of relative positioning of the input device 501. Again, the hard-copy 506 may be marked-up by one or more users having an input device 501, and the edits of each user generated by the input device 501. In this example, position or movement of the pen 501 may be determined using coding techniques for optically sensing movement of the input device 501 over the paper. As noted, location/movement may be determined using a comparison algorithm in which the relative position of objects within each frame of image data are detected and used to determine movement of the input device 501. The resulting edits may be transmitted to the computing device in which the document originated, for example, for updating of the original data file. The edits may be transmitted through a computing device, such as the Pocket PC 507 for transmission to the destination device either through a wireless or wired communication or upon docking the device containing edits in the computing device.

The electronic document may also be transmitted to a second computing device, such as the Tablet PC 503 illustrated. In that environment, the document may be edited on the screen of the tablet device 503 using the input device 501 as a simple stylus. Those inputs may be forwarded from the Tablet PC 503 to the computing device storing the original copy of the document as annotations to the document or as edits for incorporation into that document, for example.

While the description above and accompanying figures depict embodiments utilizing specific components, the addition of components and/or removal of any component depicted is within the scope of the present invention. Similarly, the relocation of various components within the input device structure may be implemented without greatly impacting the accuracy with which the image sensor or the inertial sensors detect movement of the pen and produce electronic ink. For example, the image sensor may be replaced by or supplemented with a sensing device for detecting properties of the surface or object over which the input device may be moved. Thus, if the maze pattern was formed on the surface of an object such that the pattern could be detected based on the radiation of energy outside the visible light spectrum, reflectance of such energy transmitted to the object, or other such sensing techniques. Sensing of any property of the surface may be detected and used to determine position and/or movement of the input device over the surface of an object. As a further example, a microphone sensing system may be employed such that the microphone detects acoustic reflections or emissions from the object over which the input device is positioned.

The illustrative embodiments described and illustrated above have described an input device implemented in the shape of a pen. Aspects of the present invention are applicable, however, to input devices of any number of shapes and sizes.

Use of such an input device should enable personal computing in any location. Thus, users equipped with the described input device may generate or edit data files regardless of where they may be. Documents and other information may be generated, edited or recorded in an office setting, in a classroom, in a hotel, while in transit, or even on the beach.

As noted, the input device may include a suitable display. Alternative, the display of a host computing device may be used to review documents and images created. The user may select formatting of the document before or after the information, such as text, is input, or may review the document and make changes to the format of the document. Viewing the document created on such a display, in the context of the above example, the user may insert a header including his or her address in the appropriate location.

An input device equipped with an image sensor and linked to a host PC in order to read positionally encoded media, such as paper or transparent film, provides for electronic annotation of documents. The present invention provides for a method of using the input device in conjunction with a whiteboard or other writing surface as the encoded medium. The input device may attach to a conventional whiteboard marker. A whiteboard may be encoded directly with the position information on its surface or via active light emitting diodes that trace out the encoded pattern on the whiteboard. Embedding an embedded interaction coding (EIC) pattern into printed documents or into a surface of a specific platform provides a new interaction mode for computing, which can keep a user's experience consistent.

Operational Examples Pertaining to Audio Functionality

Input devices having audio capabilities according to aspects of the invention can provide various benefits. For instance, input devices having an audio unit, such as audio unit 355 of FIG. 4, can provide multi-functional benefits related to the audio features and the digital pen functionality. Such a device can provide the digital ink and writing benefits of a digital pen while in the writing mode, as well as provide benefits related to its audio capabilities. For instance, such a device could provide audio feedback (e.g., warnings) during use or at other times, could provide audio information pertaining to a writing (e.g., translate words or record annotated comments for the writing), and provide functionality unrelated to the pen operations (e.g., provide an MP3 player or voice recorder). In addition, such a device can provide command and control benefits, such as voice command options and voice recognition benefits.

Furthermore, the input device of the present invention can also be used for remote storage and transfer of data at a later time. Thus, the input device of the present invention can be used without a host PC nearby. The processing power and storage capabilities of the input device can process images captured by the image sensor and audio data captured by the audio unit to store them for transmission at a later time. For example, when a user uses the input device to record verbal notes and/or annotate a document, the images, notes and/or annotations can be processed and stored in the input device indefinitely. Alternatively, the data can be transferred to a personal digital assistant (PDA) immediately and/or at a later time and processed and stored on the PDA. If the PDA has wireless communication capabilities, the data can be transferred to a host PC or a server at a remote location.

For example, when users travel, the notes, annotations and scenes captured with the input device can be transferred back to their host PC via their smart phone. A user can make annotations to a document while on a plane and save the annotations for transmittal to a host PC and/or server at a later time, such as when the plane has landed. In addition, the input device can be used as a pass-through device that provides extended functionality to a host computer. For instance, an input device in communication with a host computer via a wireless or a wired connection may be used as a microphone or external speaker for the host computer. In another example, processing capability of the host computer could be advantageously used by the input device to augment its capabilities, such as to provide speech recognition processing, handwriting recognition processing, language translation capabilities, and/or Internet access for updates to software stored in the input device, etc.

As noted above, the input device may include a suitable display, such as display 212 in FIG. 2, which can permit the user to review images captured by the device and to interact with the device. Alternatively, the display of a host computing device may be used to review documents and audio information. The user may select formatting of the document before or after the information, such as text, is input, or may review the document and make changes to the format of the document.

Figure 6:
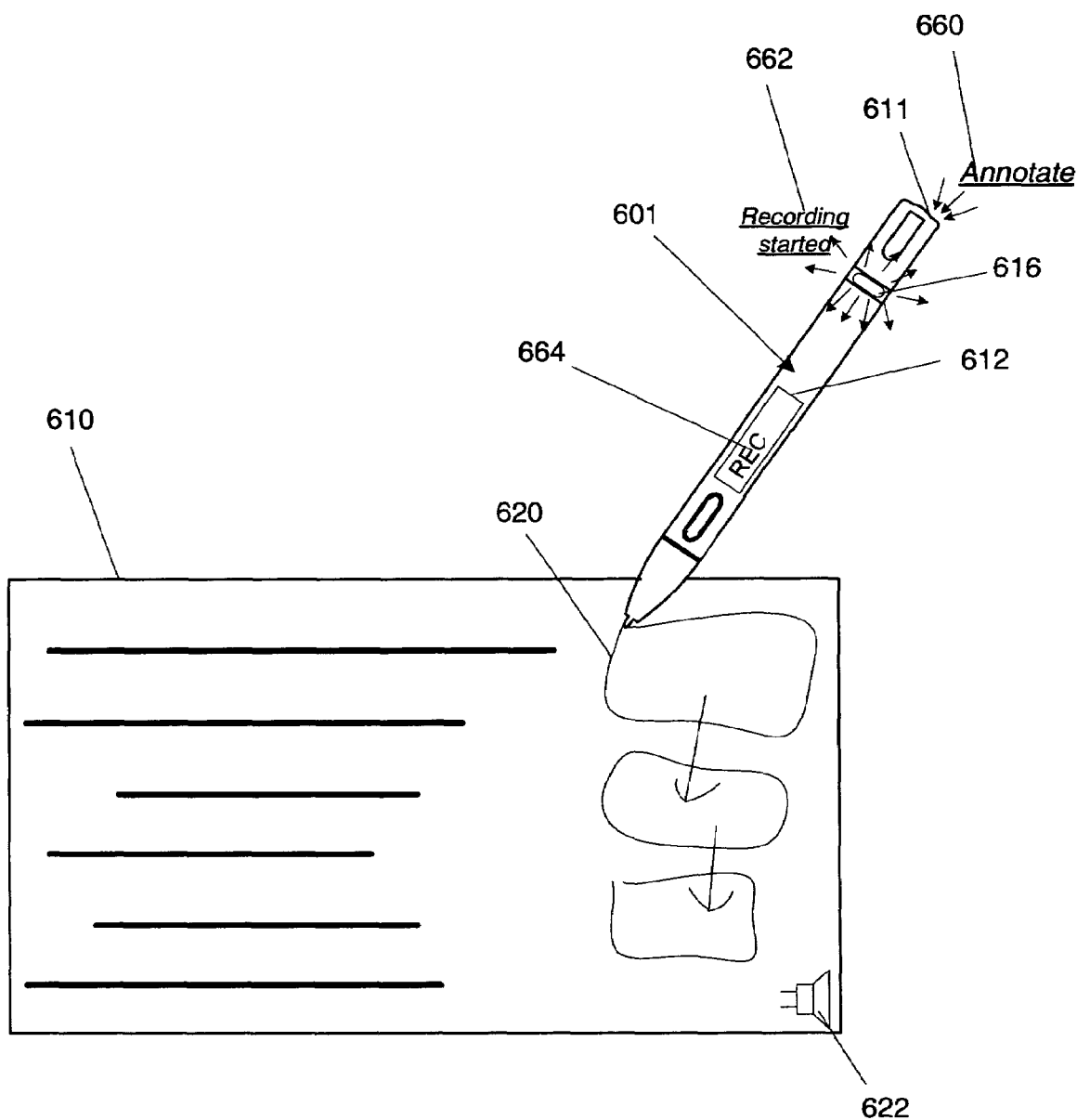
FIGS. 6-8B illustrate uses of an input device in accordance with additional embodiments of the present invention.

FIG. 6 shows an input device 601 in an example configuration that illustrates aspects of the present invention including audio functionality. As shown, input device 601 includes a display 612, a speaker 616, and a microphone 611. The speaker and microphone are generally part of an audio unit, such as audio unit 355 of FIG. 4. In the example shown in FIG. 6, input device 601 is a digital pen being used to annotate a document 610 by drawing the graphic 620 in the document. Input device 601 has computer-readable instructions stored therein that permits it to recognize verbal commands received via microphone 611 and to execute those commands. The computer-readable instructions may include conventional speech recognition technology, such as grammar-constrained speech recognition, natural speaking speech recognition, or other types of speech recognition. A grammar-constrained system installed on the pen may be beneficial for a variety of pre-programmed commands. For instance, the pen may be configured to recognize commands to change modes, settings, and functional options of the pen. A natural-speaking based system can provide flexibility for the user to custom design commands, or could provide an electronic dictation system that interprets speech and stores the textual translation. However, a grammar-constrained system may require less processing and initial set-up than a natural speaking system.

In the example represented in FIG. 6, pen 601 includes speech recognition capability for recognizing specific verbal commands related to mode settings and functions on the pen. As illustrated, the user has spoken the command 660 of "annotate," which the pen has recognized as a command that, when executed, causes the pen to record audio information received via the microphone and to annotate it to the document presently being modified. A graphic 622 may be added to the document display to show the presence of annotated audio information for the displayed portion of the document.

In addition, pen 601 may provide verbal information that pertains to its mode, acknowledges receipt of a command, provide warnings or error messages, or for other reasons. In the example of FIG. 6, pen 601 plays the verbal messsage 662 of "recording started" to indicate the annotation recording is underway. The verbal message may be produced as a pre-recorded sound file stored in the pen. In addition, the verbal message may be produced via a speech synthesizer system, such as speech synthesizer 359 shown in FIG. 4. As also shown, display 612 may provide a visual indicator of the current mode or of a command received, such as to display the verbal indicator 664 of "REC."

Figure 7:
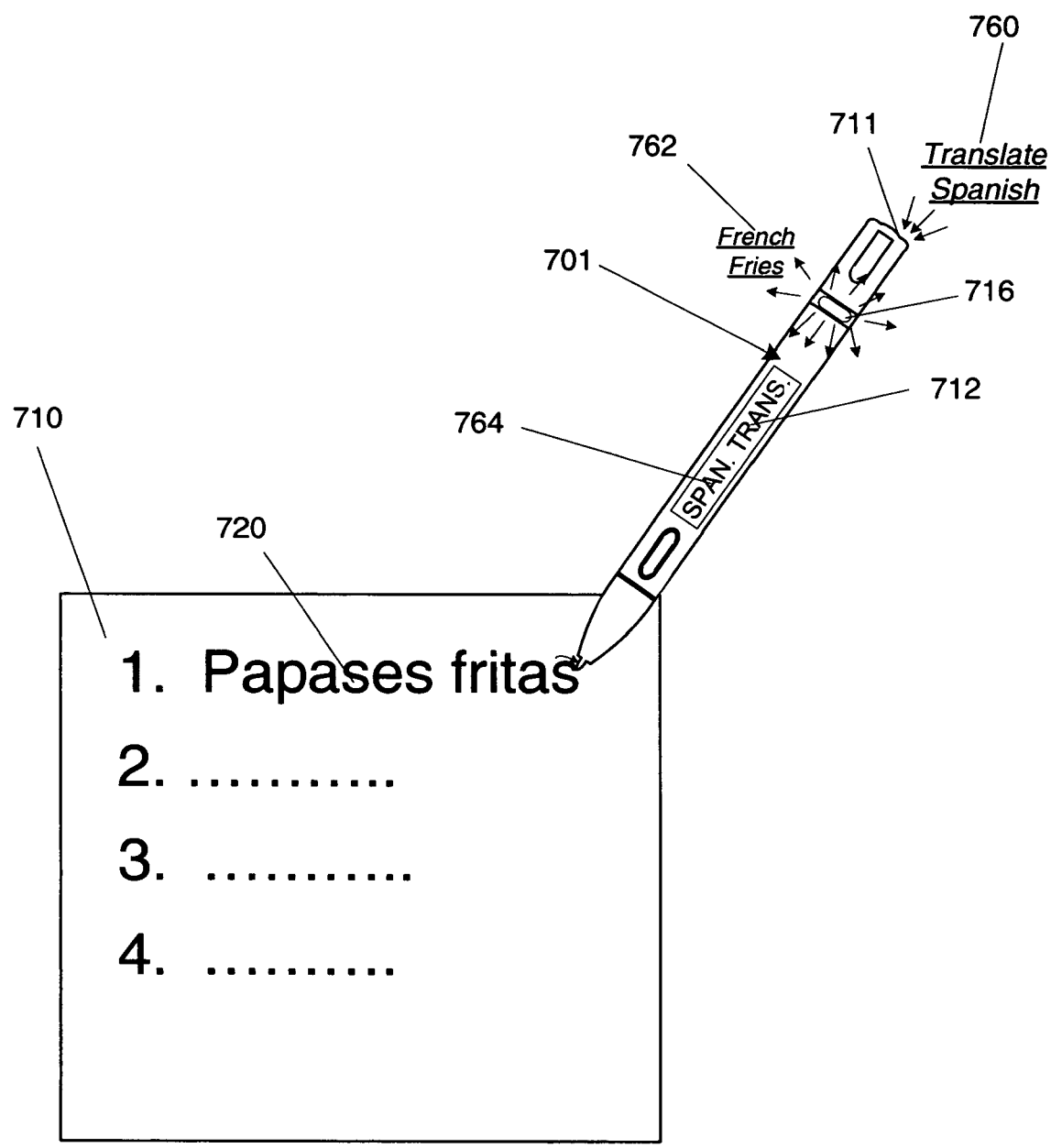

FIG. 7 shows an input device 701 in an example configuration that illustrates additional aspects of the present invention including audio capabilities. As shown, input device 701 also includes a display 712, a speaker 716, and a microphone 711. In the configuration shown in FIG. 7, input device 701 is a digital pen being used to recognize a graphic 720 being traced by the pen. In this example, the pen also has language translation capability such that it can recognize the graphic representation of a phrase in a first language (e.g., Spanish in the present example), translate the phrase, and provide the verbal translation to the user. Although coupled with language translation capability in this example, recognition of a traced graphic may practiced on its own and may provide a variety of benefits. For instance, recognition of traced graphics can be very beneficial for students learning languages, increasing their vocabulary, learning geometric shapes, etc. For instance, such functionality could assist young children with learning letters and shapes.

In the example shown, the user has given the verbal command 760 to "translate Spanish," which places the pen in a mode to translate Spanish words and phrases into English. Document 710 in the example shown may be a menu that the user encounters while traveling in a Spanish-speaking country. While the user traces the menu phrase 720 while in this mode, the pen interprets the handwriting movements and identifies the phrase as the Spanish phrase "papases fritas." The pen then proceeds to execute translation programming stored therein (or optionally stored in a host computer in communication with the pen) and to translate the phrase into the English equivalent of "French fries." The pen subsequently articulates the identified interpretation and provides the verbal phrase "French fries" to the user via the speaker, which may be produced via speech synthesizer 359 of FIG. 4. Alternatively or in concert with the verbal translation, display 712 may show the textual translation 764 of "French fries." However, as shown, display 712 may also provide the textual mode indicator 764 of "Span. Trans.," which indicates that the pen is in the Spanish translation mode.

Figure 8A:
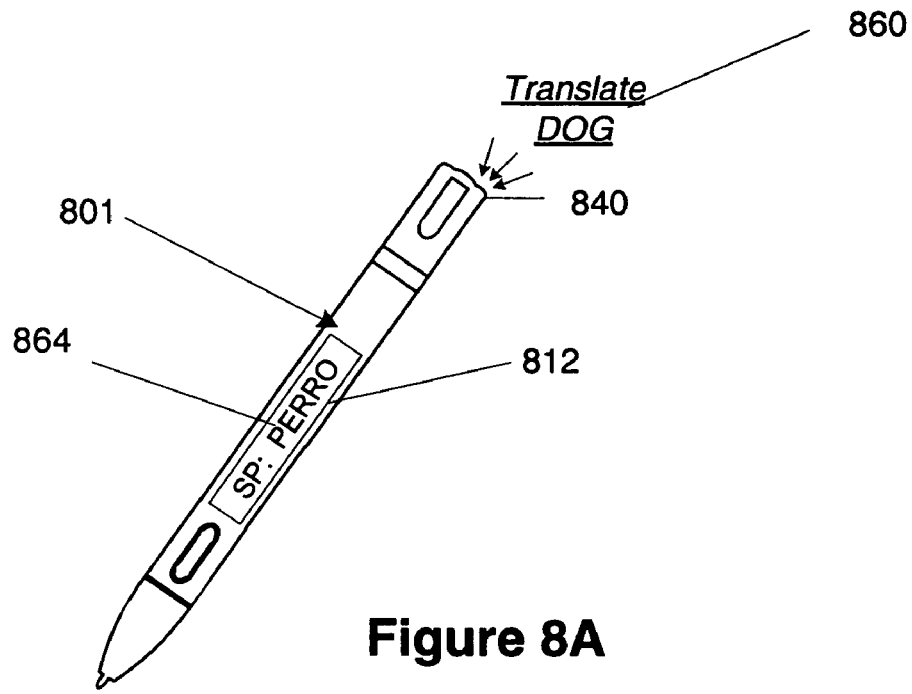
Figure 8B:
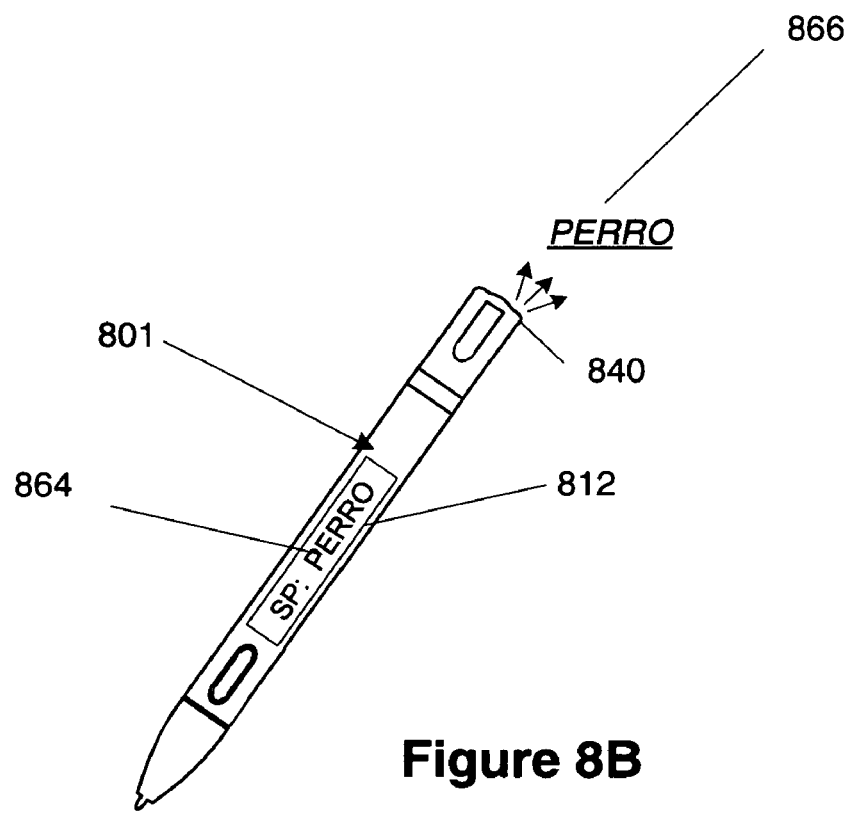

FIGS. 8A and 8B show an input device 801 in an example configuration that illustrates further aspects of the present invention. As shown, input device 801 also includes a display 812 and a combination speaker/microphone 840. In the configuration shown in FIG. 8A, input device 801 is a digital pen being used to recognize a verbal input 860 of the command "Translate 'Dog,'" which the user provides while the pen is in the Spanish translation mode. The display 812 shows mode and status information 864 to indicate that it is in the Spanish translation mode and to provide the Spanish translation of "Perro." As shown in FIG. 8B, the pen may also provide the verbal translation 866 of "Perro" by articulating the word through speaker/microphone 840.

The speaker/microphone unit 840 shown in FIGS. 8A and 8B is a combination unit that provides space-saving benefits for the small form-factor device of a pen. The combination unit can be a conventional small speaker, which, as is known in the art, can also operate in reverse as a microphone.

Although the invention has been defined using the appended claims, these claims are illustrative in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations. For instance, in various embodiments, a certain order to the data has been shown. However, any reordering of the data is encompassed by the present invention. Also, where certain units of properties such as size (e.g., in bytes or bits) are used, any other units are also envisioned.

I claim:

1. An electronic pen, comprising:
   a semantic input interface on the electronic pen;
   a sensory output interface on the electronic pen;
   a microphone on the electronic pen;
   a processor on the electronic pen; and
   a memory on the electronic pen, wherein the memory includes computer-executable instructions stored on the memory, wherein the computer-executable instructions are configured for:
   detecting one of:
      audio information external to the electronic pen, wherein the audio information is detected by the microphone of the electronic pen device and recorded to the memory of the electronic pen, or
      a semantic ink object, wherein the semantic ink object is detected by the semantic input interface on the electronic pen;
   when audio information is detected by the microphone of the electronic pen device, associating the stored audio information with an electronic document presently being modified by the electronic pen, storing the audio information with the electronic document, and displaying an icon in the presently modified electronic document that indicates the audio information; and
   when the semantic ink object is detected by the semantic input interface on the electronic pen, matching the semantic ink object to preexisting output interface information and outputting the preexisting output interface information on the sensory output interface of the electronic pen.

2. The electronic pen of claim 1, wherein the semantic input interface includes a least one member of a group comprising: a virtual ink sensor, a non-virtual ink sensor, a pressure sensor, an image sensor, and a inertial sensor.

3. The electronic pen of claim 1, wherein the sensory output interface includes at least one member of a group comprising: a display and a speaker.

4. The electronic pen of claim 1, wherein the semantic ink object includes at least one member of a group comprising: a letter, a number, a word, a phase, a shape and a symbol.

5. The electronic pen of claim 1, wherein semantic ink object includes at least one member of a group comprising: a preexisting virtual ink object, a preexisting non-virtual ink object, a virtual ink object being generated and a non-virtual ink object being generated.

6. The electronic pen of claim 1, wherein matching the semantic ink object to preexisting output interface information includes translating the preexisting output information from a first language to a second language and outputting the translated output interface information to at least one member of a group comprising: a display and a speaker.

7. The electronic pen of claim 1, wherein detecting the semantic ink object includes at least one member of a group comprising: detecting the generation of a semantic ink object by the electronic pen and detecting the tracing of a preexisting semantic ink object by the electronic pen.

8. A computer-readable storage medium on an electronic pen, wherein the computer-readable storage medium has computer-executable instructions for causing the output of pen interface information in response to a detection of a semantic ink object, the instructions comprising:
  detecting, on the electronic pen, one of:
    audio information external to the electronic pen, wherein the audio information is detected by a microphone of the electronic pen and recorded to a memory of the electronic pen, or
    a semantic ink object, wherein the semantic ink object is detected by a semantic input interface on the electronic pen;
  when audio information is detected by the microphone of the electronic pen, associating the stored audio information with an electronic document presently being modified by the electronic pen, storing the audio information with the electronic document, and displaying an icon in the presently modified electronic document adjacent to the portion of the document presently being modified, wherein the icon indicates a presence of the audio information; and
  when the semantic ink object is detected by the semantic input interface on the electronic pen, matching the semantic ink object to preexisting output interface information and outputting the preexisting output interface information on a sensory output interface of the electronic pen.

9. The computer-readable storage medium of claim 8, wherein the semantic input interface includes a least one member of a group comprising: a virtual ink sensor on the pen, a non-virtual ink sensor on the pen, a pressure sensor on the pen, an image sensor on the pen, and a inertial sensor on the pen.

10. The computer-readable storage medium of claim 8, wherein the sensory output interface includes at least one member of a group comprising: a display on the pen and a speaker on the pen.

11. The computer-readable storage medium of claim 8, wherein the semantic ink object includes at least one member of a group comprising: a letter, a number, a word, a phrase, a shape and a symbol.

12. The computer-readable storage medium of claim 8, wherein semantic ink object includes at least one member of a group comprising: a preexisting virtual ink object, a preexisting non-virtual ink object, a virtual ink object being generated and a non-virtual ink object being generated.

13. The computer-readable storage medium of claim 8, wherein matching the semantic ink object to preexisting output interface information includes translating the preexisting output information from a first language to a second language and outputting the translated output interface information to at least one member of a group comprising: a display on the pen and a speaker on the pen.

14. The computer-readable storage medium of claim 8, wherein detecting the semantic ink object includes at least one member of a group comprising: detecting the generation of a semantic ink object by the electronic pen and detecting the tracing of a preexisting semantic ink object by the electronic pen.

15. A computer-implemented method for causing an output of pen interface information in response to a detection of a semantic ink object, the method comprising:
  detecting, on an electronic pen, one of:
    audio information external to the electronic pen, wherein the audio information is detected by a microphone of the electronic pen device and recorded to a memory of the electronic pen, or
    a semantic ink object, wherein the semantic ink object is detected by a semantic input interface on the electronic pen;
  when audio information is detected by the microphone of the electronic pen device, associating the stored audio information with an electronic document presently being modified by the electronic pen, storing the audio information with the electronic document, and displaying an icon in the presently modified electronic document that indicates the audio information; and
  when the semantic ink object is detected by the semantic input interface on the electronic pen, matching the semantic ink object to preexisting output interface information and outputting the preexisting output interface information on a sensory output interface of the electronic pen.

16. The computer-implemented method of claim 15, wherein the semantic ink object includes at least one member of a group comprising: a preexisting virtual ink object, a preexisting non-virtual ink object, a virtual ink object being generated and a non-virtual ink object being generated.

17. The computer-implemented method of claim 15, wherein matching the semantic ink object to preexisting output interface information includes translating the preexisting output information from a first language to a second language and outputting the translated output interface information to at least one member of a group comprising: a display and a speaker.

18. The computer-implemented method of claim 15, wherein detecting the semantic ink object includes at least one member of a group comprising: detecting the generation of a semantic ink object by the electronic pen and detecting the tracing of a preexisting semantic ink object by the electronic pen.

19. The electronic pen of claim 1, wherein displaying the icon in the presently modified electronic document that indicates the audio information includes displaying the icon adjacent to a portion of the document presently being modified.

20. The computer-implemented method of claim 15, wherein displaying the icon in the presently modified electronic document that indicates the audio information includes displaying the icon adjacent to a portion of the document presently being modified.

* * * * *

UNITED STATES PATENT AND TRADEMARK OFFICE
CERTIFICATE OF CORRECTION

| | | |
|---|---|---|
| PATENT NO. | : 7,627,703 B2 | Page 1 of 1 |
| APPLICATION NO. | : 11/168469 | |
| DATED | : December 1, 2009 | |
| INVENTOR(S) | : Thomas C. Oliver | |

It is certified that error appears in the above-identified patent and that said Letters Patent is hereby corrected as shown below:

In column 24, line 62, in Claim 4, delete "phase," and insert -- phrase, --, therefor.

Signed and Sealed this
Twenty-fifth Day of January, 2011

David J. Kappos
*Director of the United States Patent and Trademark Office*